(12) United States Patent
Clark et al.

(10) Patent No.: US 7,874,228 B2
(45) Date of Patent: Jan. 25, 2011

(54) NON-TRANSLATING TELESCOPIC RAKE PIVOT FOR STEERING COLUMN ASSEMBLY

(75) Inventors: Michael W. Clark, Essexville, MI (US); Joshua S. McDonald, Bay City, MI (US)

(73) Assignee: Nexteer (Beijing) Technology Co., Ltd.

( * ) Notice: Subject to any disclaimer, the term of this patent is extended or adjusted under 35 U.S.C. 154(b) by 56 days.

(21) Appl. No.: 12/030,943

(22) Filed: Feb. 14, 2008

(65) Prior Publication Data
US 2009/0205458 A1 Aug. 20, 2009

(51) Int. Cl.
*B62D 1/18* (2006.01)
(52) U.S. Cl. .......... 74/493; 280/775
(58) Field of Classification Search .......... 74/492, 74/493; 280/775
See application file for complete search history.

(56) References Cited

U.S. PATENT DOCUMENTS

| | | | |
|---|---|---|---|
| 5,465,632 A * | 11/1995 | Oki et al. .......... 74/493 |
| 5,927,152 A * | 7/1999 | Marzio et al. .......... 74/493 |
| 6,467,807 B2 | 10/2002 | Ikeda et al. |
| 7,219,926 B2 | 5/2007 | Ikeda et al. |
| 2005/0104353 A1* | 5/2005 | Ikeda et al. .......... 280/775 |

* cited by examiner

*Primary Examiner*—Richard W Ridley
*Assistant Examiner*—Terence Boes
(74) *Attorney, Agent, or Firm*—Cantor Colburn LLP

(57) ABSTRACT

A steering column assembly includes a column jacket and a rake bracket for mounting the column jacket to a vehicle. A bearing rotatably supports an output shaft within an interior of the column jacket and is in sliding engagement with the column jacket during telescopic adjustment of the column jacket along a longitudinal axis. The column jacket defines a telescope slot near a lower end of the column jacket. A fastener is coupled to the rake bracket and extends through the telescope slot into engagement with the bearing to define tilt axis for pivotal movement of the column jacket relative to the rake bracket.

15 Claims, 5 Drawing Sheets

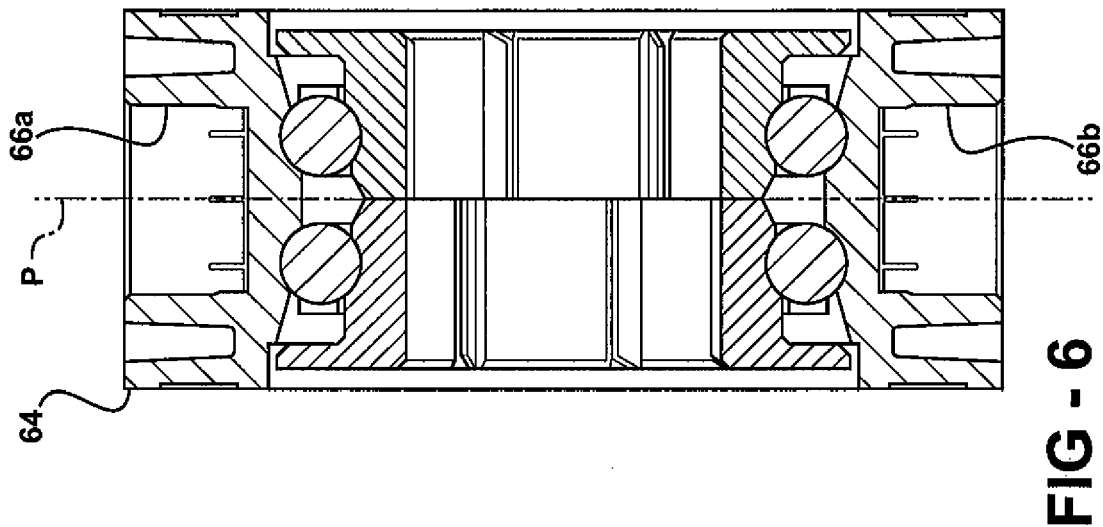
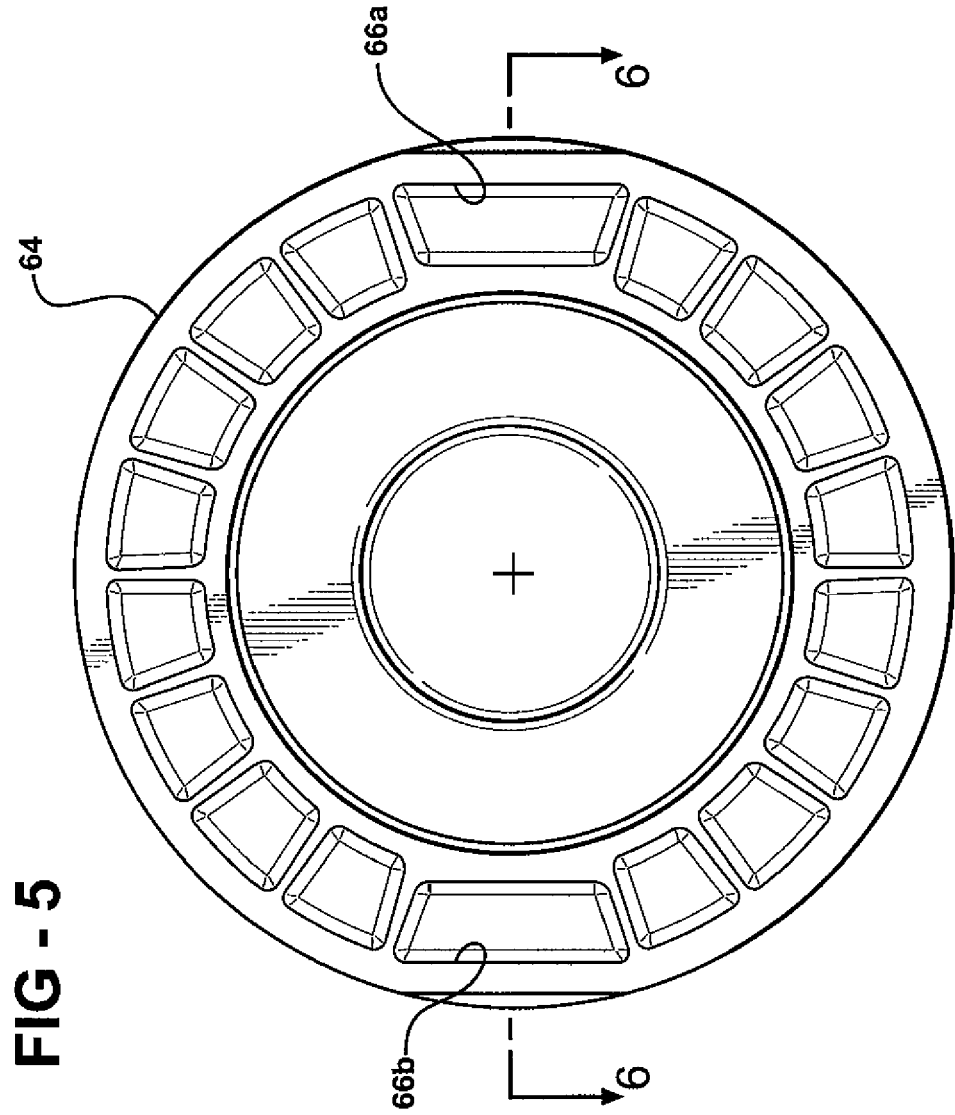

US 7,874,228 B2

NON-TRANSLATING TELESCOPIC RAKE PIVOT FOR STEERING COLUMN ASSEMBLY

BACKGROUND OF THE INVENTION

1. Field of the Invention

The subject invention generally relates to an adjustable steering column assembly for a vehicle.

2. Description of the Prior Art

Adjustable steering column assemblies may be both telescopically adjustable along a longitudinal axis and pivotably adjustable about a tilt axis. The steering column assemblies include a column jacket. The column jacket may include an upper column jacket and a lower column jacket. The upper column jacket and the lower column jacket are telescopically engaged with each other along the longitudinal axis. The upper column jacket rotatably supports an upper steering shaft (input shaft) therein. The lower column jacket rotatably supports a lower steering shaft (output shaft) therein. A steering wheel is mounted to an upper end of the upper steering shaft. The upper steering shaft and the lower steering shaft rotate together and are telescopically engaged with each other through a splined connection therebetween for rotation about the longitudinal axis.

Typically, the upper column jacket includes a compression bracket. The compression bracket defines a pair of telescoping slots permitting telescoping adjustment of the column jacket. A rake bracket mounts the steering column to the vehicle. The rake bracket defines a pair of rake slots permitting angular adjustment (tilting or pivot adjustment) of the column jacket. The pair of rake slots are disposed adjacent the pair of telescopes slots, with a rake bolt extending through the rake slots and the telescope slots. A mounting bracket is disposed adjacent a lower end of the lower column jacket, and mounts the steering column assembly to the vehicle. The mounting bracket defines the tilt axis about which the column jacket pivots. The tilt axis is disposed near a lower end of the lower column jacket. The movement of the rake bolt within the rake slots and the telescope slots delimits the extent of adjustment of the column jacket relative to the rake bracket. A clamping mechanism releasably clamps the rake bracket to the compression bracket.

As the adjustable steering column assemblies are mounted under an instrument panel of the vehicle, the packaging, i.e., space requirements of the steering column assembly must be minimized. Therefore, a need continues to exist for a compact adjustable steering column assembly that is cost effective to produce.

SUMMARY OF THE INVENTION AND ADVANTAGES

The subject invention provides a steering column assembly for a vehicle. The steering column assembly comprises a rake bracket configured for attachment to the vehicle. A column jacket is coupled to the rake bracket. The column jacket extends along a longitudinal axis, and defines an interior and at least one telescope slot. The at least one telescope slot extends through the column jacket parallel to the longitudinal axis. An output shaft is disposed within the interior. The output shaft is concentric with the column jacket. The column jacket is moveable along the longitudinal axis relative to the output shaft and the rake bracket. At least one fastener is coupled to the rake bracket and extends through the at least one telescope slot. The at least one fastener defines a tilt axis for pivotal movement of the column jacket relative to the rake bracket. The at least one fastener is moveable within the telescope slot during the movement of the column jacket along the longitudinal axis.

Accordingly, the subject invention provides a steering column assembly in which the telescope slot is incorporated into the column jacket, with the fastener defining the tilt axis extending through the telescope slot to telescopically couple the column jacket to the rake bracket. Therefore, the disclosed steering column assembly eliminates the bracket formerly utilized to define the telescope slot and utilizes the fastener defining the tilt axis to also telescopically couple the column jacket to the rake bracket, thereby providing a compact and cost effective steering column assembly.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 5 is an end view of a bearing of the steering column assembly;

FIG. 6 is a cross sectional view of the bearing along cut line 6-6 shown in FIG. 5;

FIG. 9 is a fragmentary, partial cross sectional view of the steering input shaft and the output shaft within the column jacket.

DETAILED DESCRIPTION OF THE INVENTION

Referring to the Figures, wherein like numerals indicate corresponding parts throughout the several views, a steering column assembly is shown generally at 20. The steering column assembly 20 is for a vehicle and rotatably supports a steering wheel (not shown).

Figure 1:
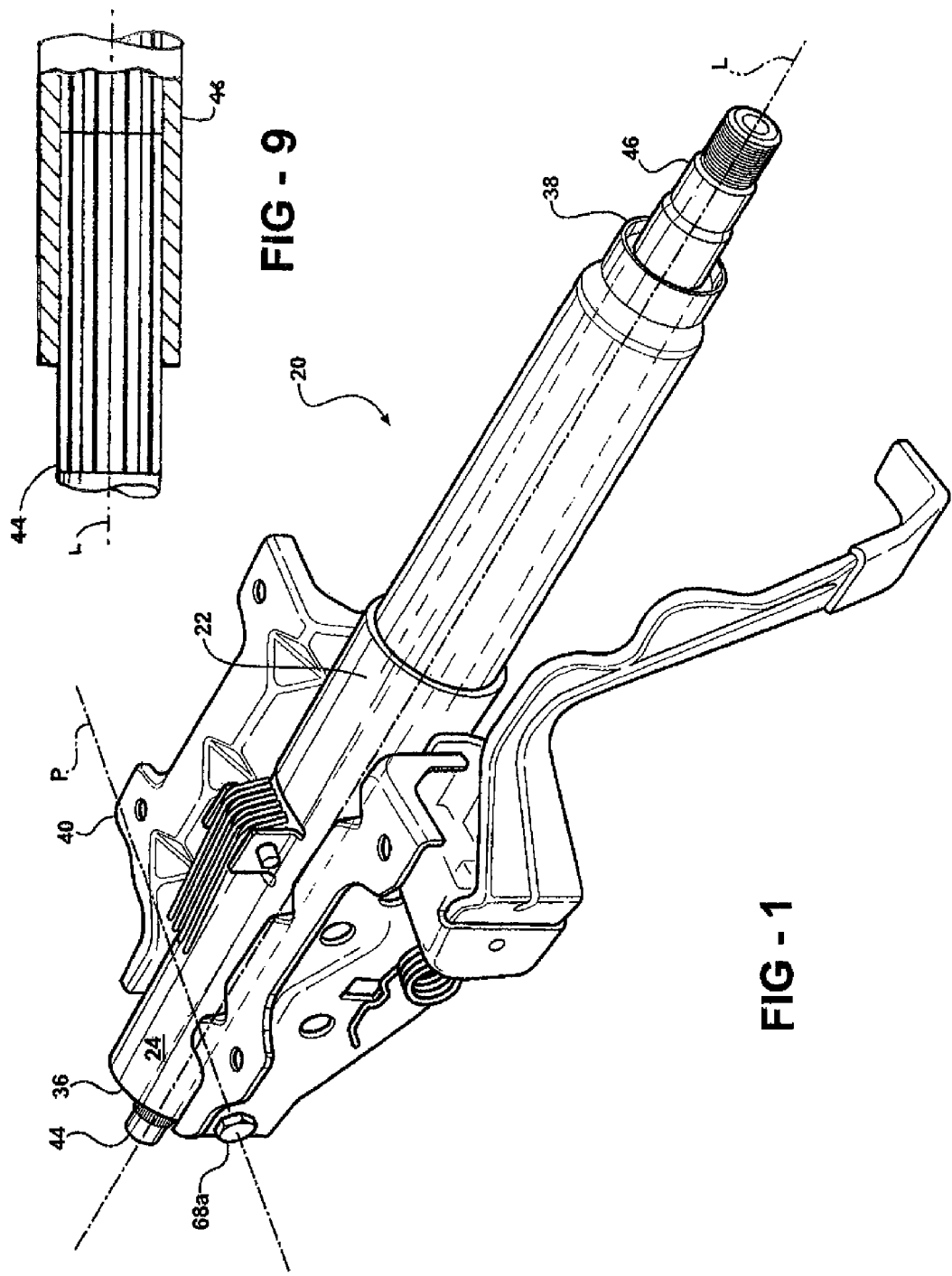
FIG. 1 is a rear perspective view of a steering column assembly.
Figure 2:
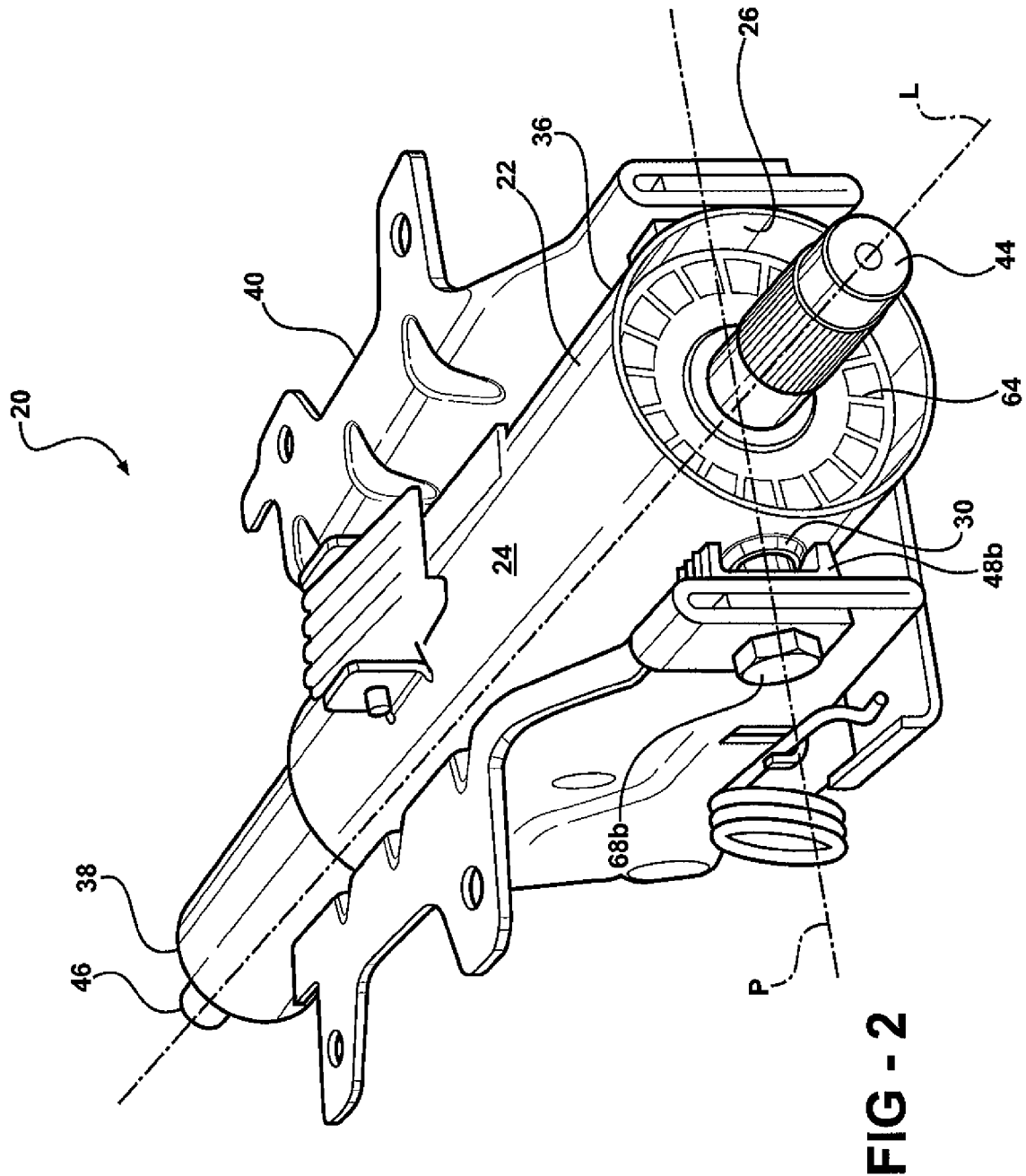
FIG. 2 is a front perspective view of the steering column assembly.
Figures 3, 4:
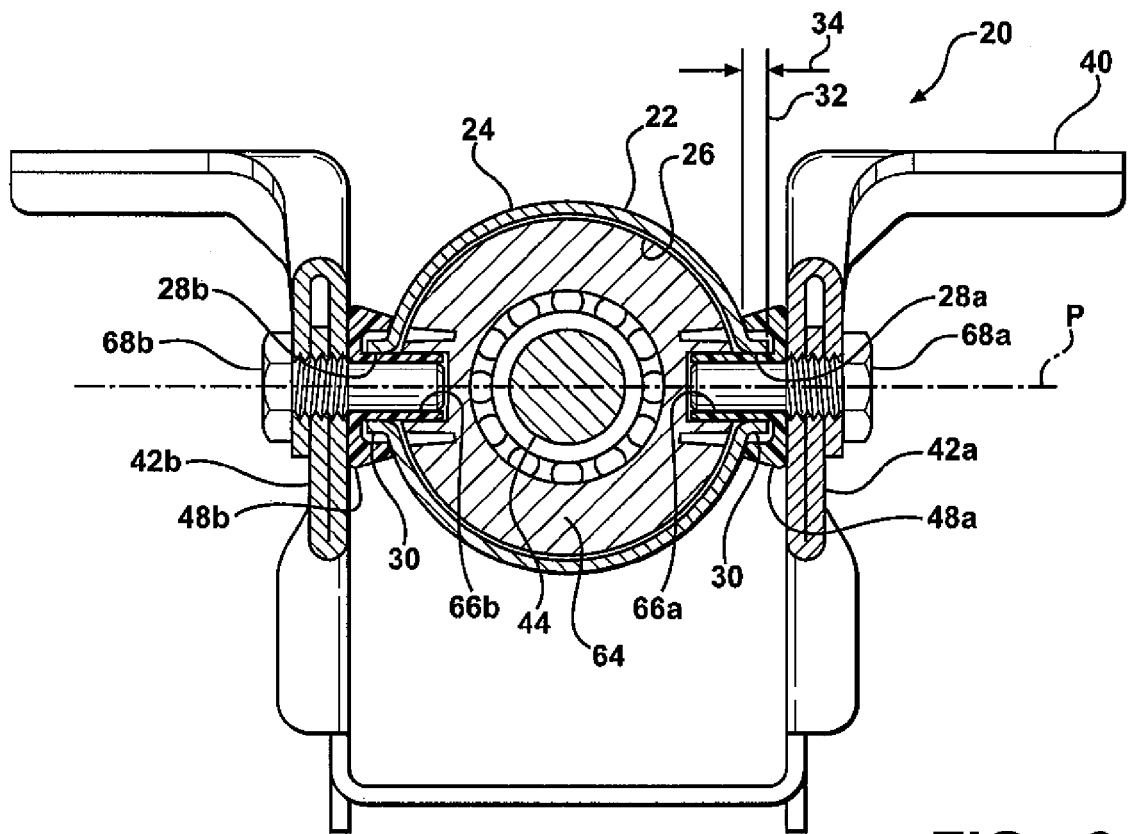
FIG. 3 is a cross sectional view of the steering column assembly.
FIG. 4 is a fragmentary partial exploded view of the steering column assembly.

Referring to FIGS. 1, 2 and 4, the steering column assembly 20 comprises a column jacket 22. The column jacket 22 extends along a longitudinal axis L. The column jacket 22 includes an outer wall 24 that defines an interior 26 and at least one telescope slot 28. The telescope slot 28 extends through the outer wall 24 of the column jacket 22 and extends parallel to the longitudinal axis L. Preferably, the at least one telescope slot 28 includes a pair of telescope slots, i.e., a first telescope slot 28a and a second telescope slot 28b, disposed opposite each other about the longitudinal axis L. In other words, each of the pair of telescope slots 28a, 28b is spaced one hundred eighty degrees (180°) apart from the other about the longitudinal axis L. The length of the telescope slot 28 delimits the extent of longitudinal adjustment, i.e., movement, of the column jacket 22 along the longitudinal axis L.

Referring also to FIG. 3, the column jacket 22 includes a lip 30 extending outwardly, away from the column jacket 22 and away from the longitudinal axis L. The lip 30 encircles the telescope slot 28. The lip 30 includes a distal edge 32 spaced from the column jacket 22 a lip distance 34. The column jacket 22 includes a lower end 36 and an upper end 38. The upper end 38 is spaced from the lower end 36 along the longitudinal axis L. The telescope slot 28 is disposed near the lower end 36 of the column jacket 22, as best seen in FIGS. 2 and 4.

The steering column assembly 20 further comprises a rake bracket 40. The column jacket 22 is coupled to the rake bracket 40 for pivotal movement about a tilt axis P relative to the rake bracket 40 and for telescoping movement along the longitudinal axis L relative to the rake bracket 40. The rake bracket 40 is configured for attachment to the vehicle, i.e., the rake bracket 40 mounts the steering column assembly 20 to the vehicle. The rake bracket 40 may be configured to attach the steering column assembly 20 to the vehicle in any suitable manner. Accordingly, the precise configuration of the rake bracket 40 is customizable to accommodate specific vehicles.

The rake bracket 40 includes a first wall 42a and a second wall 42b spaced from the first wall 42a and in parallel relationship to the first wall 42a. The second wall 42b is disposed opposite the column jacket 22 from the first wall 42a, i.e., the first wall 42a and the second wall 42b sandwich the column jacket 22 therebetween.

An output shaft 44 is disposed within the interior 26 of the column jacket 22, near the lower end 36 of the column jacket 22. The output shaft 44 is concentric with the column jacket 22 and the longitudinal axis L. The column jacket 22 is moveable along the longitudinal axis L relative to the output shaft 44 and the rake bracket 40. Accordingly, as the column jacket 22 is telescopically adjusted forward, the column jacket 22 swallows the output shaft 44.

A steering shaft 46 (input shaft) is also disposed within the interior 26 of the column jacket 22. The steering wheel is mounted to the steering input shaft 46 at the upper end 38 of the column jacket 22. The steering input shaft 46 is in sliding engagement with the output shaft 44, and is moveable relative to the output shaft 44 along the longitudinal axis L, as best seen in FIG. 9. The steering input shaft 46 is rotatable with the output shaft 44 about the longitudinal axis L for transmitting a rotational input from the steering wheel to a steering system of the vehicle.

Figure 7:
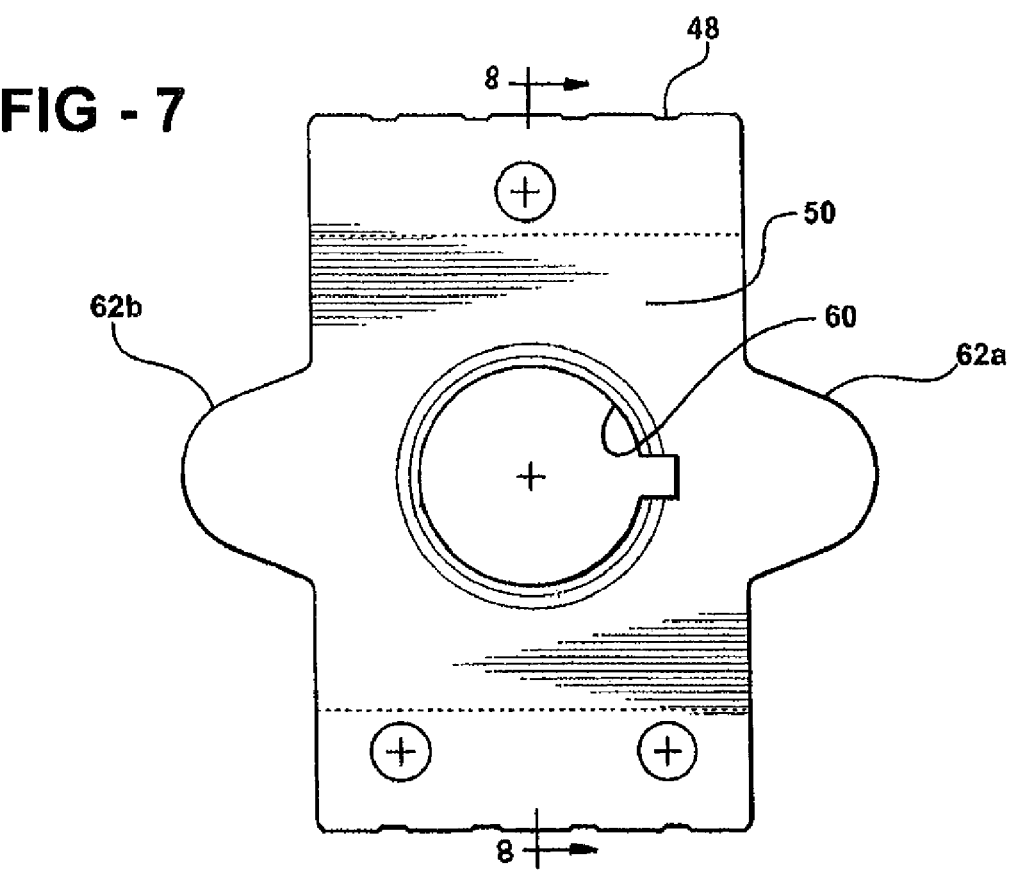
FIG. 7 is an end plan view of a telescoping guide of the steering column assembly.
Figure 8:
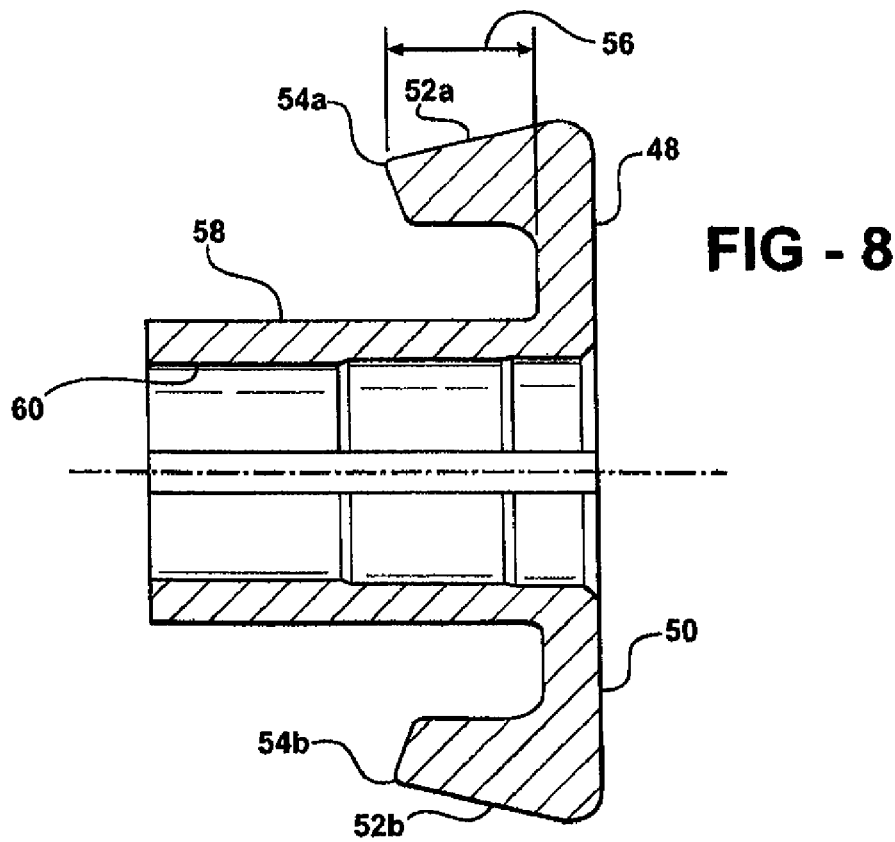
FIG. 8 is a cross sectional view of the telescoping guide along cut line 8-8 shown in FIG. 7.

As best shown in FIG. 3, a first telescoping guide 48a is disposed between the first wall 42a of the rake bracket 40 and the column jacket 22, and a second telescoping guide 48b is disposed between the second wall 42b of the rake bracket 40 and the column jacket 22. Referring to FIGS. 7 and 8, each of the telescoping guides 48a, 48b include a planar portion 50, which is disposed adjacent the first wall 42a and the second wall 42b of the rake bracket 40 respectively.

The telescoping guides 48a, 48b include at least one flange 52 extending from the planar portion 50. The at least one flange 52 extends along the tilt axis P toward the longitudinal axis L. The at least one flange 52 abuts the column jacket 22 in sliding engagement to guide the column jacket 22 during movement of the column jacket 22 along the longitudinal axis L. Preferably, the at least one flange 52 includes a pair of flanges, i.e., a first flange 52a and a second flange 52b, in spaced parallel relationship to engage the outer wall 24 of the column jacket 22 on opposite sides of the longitudinal direction of the telescope slot 28 relative to the longitudinal axis L.

The at least one flange 52 includes a distal end 54 spaced from the planar portion 50 of the telescoping guide 48 a flange distance 56. The lip distance 34 of the lip 30 on the column jacket 22 encircling the telescope slot 28 is less than the flange distance 56. Accordingly, the pair of flanges 52a, 52b space the planar portion 50 of the telescoping guide 48 away from the column jacket 22 a distance greater than the lip distance 34 so that the lip 30 on the column jacket 22 does not interfere with the telescoping movement of the column jacket 22 along the longitudinal axis L. The lip 30 is formed by stamping or punching the telescope slots 28a, 28b into the column jacket 22, thereby deforming the displaced material into the lip 30. The process of stamping creates a rough or jagged surface on the distal edge 32 of the lip 30. It should be appreciated that spacing the planar portion 50 of the telescoping guides 48a, 48b away from the distal edge 32 of the lip 30 and having the flanges 52a, 52b slide against the smooth outer wall 24 of the column jacket 22 prevents the lip 30 from interfering with the movement of the telescoping guides 48a, 48b, which thereby permits the telescope slots 28a, 28b to be formed through the stamping process.

The telescoping guide 48 includes a barrel portion 58. The barrel portion 58 extends from the planar portion 50 along the tilt axis P. The barrel portion 58 is concentric with the tilt axis P. Accordingly, the barrel portion 58 of the first telescoping guide 48a and the second telescoping guide 48b are coaxially aligned along the tilt axis P. The planar portion 50 and the barrel portion 58 of the telescoping guide 48 cooperate to define a bore 60 extending through the planar portion 50 and the barrel portion 58. The bore 60 is concentric with the tilt axis P.

The telescoping guide 48 includes at least one bumper 62 extending from the planar portion 50. The bumper 62 extends along the longitudinal axis L, and is disposed within the telescoping slot. The bumper 62 engages the telescope slot 28 in response to movement of the column jacket 22 along the longitudinal axis L. In other words, as the column jacket 22 reaches the end of the telescoping adjustment determined by the length of the telescope slot 28 along the longitudinal axis L, the bumper 62 engages an end of the telescope slot 28. Preferably, the bumper 62 includes a first bumper 62a extending along the longitudinal axis L toward the upper end 38 of the column jacket 22 and a second bumper 62b extending along the longitudinal axis L toward the lower end 36 of the column jacket 22.

Referring again to FIG. 2, a bearing 64 is disposed within the interior 26 of the column jacket 22. The bearing 64 rotatably supports the output shaft 44, with the column jacket 22 being moveable over the bearing 64. The bearing 64 is translationally fixed along the longitudinal axis L relative to the rake bracket 40, i.e., the bearing 64 remains fixed in place relative to the output shaft 44 and the rake bracket 40 and does not move with the column jacket 22 during telescopic adjustment of the column jacket 22 along the longitudinal axis L.

As best seen in FIG. 2, the bearing 64 is disposed near the lower end 36 of the column jacket 22 adjacent the telescope slot 28. Referring to FIGS. 5 and 6, the bearing 64 defines at least one annular recess 66. The barrel portion 58 of the telescoping guide 48 extends into the annular recess 66, thereby extending into engagement with the bearing 64. The barrel portion 58 of the telescoping guide 48 and the annular recess 66 of the bearing 64 include a press-fit connection interconnecting the telescoping guide 48 and the bearing 64. Preferably, the bearing 64 defines a first annular recess 66a for receiving the barrel portion 58 of the first telescoping guide 48a therein, and a second annular recess 66b for receiving the barrel portion 58 of the second telescoping guide 48b therein. It should be appreciated that the telescoping guides 48a, 48b position the column jacket 22 and the bearing 64 relative to each other, and ensure that a clearance exists around the entire circumference of the bearing 64 between the column jacket 22 and the bearing 22 so that the column jacket 22 does not contact or slide against the bearing 64.

As best shown in FIG. 3, at least one fastener 68 is coupled to the rake bracket 40. Preferably, the fastener 68 includes a first fastener 68a extending through a first aperture in the first wall 42a of the rake bracket 40 and a second fastener 68b extending through a second aperture in the second wall 42b of the rake bracket 40. The first aperture and the second aperture are concentric with the tilt axis P to align the first fastener 68a and the second fastener 68b along the tilt axis P. The fastener 68 extends through the telescope slot 28 and through the bore 60 defined by the telescoping guide 48 to define the tilt axis P. The tilt axis P provides for pivotal movement of the column jacket 22 relative to the rake bracket 40. During assembly, the barrel portion 58 includes a loose fit within the annular recess 66 to permit easy assembly. Upon inserting the fastener 68 into the bore 60, the barrel portion 58 expands into the snug fit with the annular recess 66.

Referring to FIGS. 1 and 2, the fastener 68 is moveable within the telescope slot 28 during the movement of the column jacket 22 along the longitudinal axis L. The fastener 68 stays positionally fixed relative to the rake bracket 40, however, as the column jacket 22 is telescopically adjusted along the longitudinal axis L, the relative position of the fastener 68 within the telescope slot 28 changes, i.e., the telescope slot 28 moves about the fastener 68.

As described above, the at least one fastener 68 includes a pair of fasteners, e.g., the first fastener 68a and the second fastener 68b. Each of the pair of fasteners 68a, 68b extends through one of the pair of telescope slots 28a, 28b, into engagement with the bearing 64. The fasteners 68a, 68b are coupled to the bearing 64 through the telescoping guides 48a, 48b, i.e., the telescoping guides 48a, 48b interconnect the fasteners 68a, 68b and the bearing 64. The fasteners 68a, 68b and the telescoping guides 48a, 48b include a press-fit connection interconnecting the fasteners 68a, 68b and the telescoping guides 48a, 48b.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A steering column assembly for a vehicle, said assembly comprising:
   a rake bracket configured for attachment to the vehicle;
   a generally tubular-shaped column jacket coupled to said rake bracket and extending along a longitudinal axis and defining an interior and a first telescope slot extending through said column jacket parallel to said longitudinal axis, with a lip extending outwardly from said column bracket and encircling said first telescope slot;
   an output shaft disposed within said interior and concentric with said column jacket with said column jacket moveable along said longitudinal axis relative to said output shaft and said rake bracket;
   a first telescoping guide having a first planar portion and a first tubular portion extending from said first planar portion, said first tubular portion extending through said first telescope slot of said column jacket into said interior of said column jacket;
   a first fastener coupled to said rake bracket and extending through said first planar portion and said first tubular portion of said first telescoping guide, to define a tilt axis for pivotal movement of said column jacket relative to said rake bracket with said first telescope slot moveable about said first-fastener during said movement of said column jacket along said longitudinal axis; further comprising a bearing disposed within said interior of said column jacket and rotatably supporting said output shaft with said column jacket being moveable over said bearing and said bearing translationally fixed along said longitudinal axis relative to said rake bracket, wherein said bearing defines an annular recess with said first tubular portion of said first telescoping guide extending into said annular recess.

2. An assembly as set forth in line 1 wherein said column jacket further includes a second telescope slot extending through said column jacket parallel to said longitudinal axis that is disposed opposite said first telescope slot, said assembly further comprising:
   a second telescoping guide having a second planar portion and a second tubular portion extending from said second planar portion, said second tubular portion extending through said second telescope slot of said column jacket into said interior of said column jacket; and
   a second fastener coupled to said rake bracket and extending through said second planar portion and said second tubular portion of said second telescoping guide, said first and second fasteners being operably coupled to said bearing.

3. An assembly as set forth in line 1 wherein said first fastener is coupled to said bearing.

4. An assembly as set forth in claim 3 wherein said column jacket includes a lower end and an upper end spaced from said lower end along said longitudinal axis with said first telescope slot disposed near said lower end.

5. An assembly as set forth in claim 4 wherein said bearing is disposed near said lower end of said column jacket adjacent said first telescope slot.

6. An assembly as set forth in claim 5 further comprising a steering input shaft disposed within said interior of said column jacket in sliding engagement with and moveable relative to said output shaft along said longitudinal axis and rotatable with said output shaft about said longitudinal axis.

7. An assembly as set forth in claim 3 wherein said first telescoping guide interconnects said first fastener and said bearing.

8. An assembly as set forth in claim 7 wherein said first fastener and said first telescoping guide include a press-fit connection interconnecting said first fastener and said first telescoping guide.

9. An assembly as set forth in claim 7 wherein said rake bracket includes a first wall and wherein said first planar portion of said first telescoping guide is disposed adjacent said first wall.

10. An assembly as set forth in claim 9 wherein said first telescoping guide includes a first flange extending from said first planar portion along said tilt axis toward said longitudinal axis with said first flange abutting said column jacket proximate said lip in sliding engagement to guide said column jacket during movement of said column jacket along said longitudinal axis.

11. An assembly as set forth in claim 7 wherein said first telescoping guide includes at least one bumper extending from said first planar portion along said longitudinal axis and disposed within first telescope slot for engaging said first telescope slot in response to movement of said column jacket along said longitudinal axis.

12. An assembly as set forth in claim 1 wherein said first flange includes a distal end spaced from said first planar portion a flange distance and wherein said lip includes a distal edge spaced from said column jacket a lip distance less than said flange distance.

13. An assembly as set forth in line 1 wherein said first tubular portion of said first telescoping guide and said annular recess of said bearing include a press-fit connection interconnecting said first telescoping guide and said bearing.

14. An assembly as set forth in line 1 wherein said first planar portion and said first tubular portion of said first telescoping guide define a bore with said first fastener extending through said bore.

15. A steering column assembly for a vehicle, said assembly comprising:
   a rake bracket configured for attachment to the vehicle;
   a column jacket coupled to said rake bracket and extending along a longitudinal axis and defining an interior and a first telescope slot extending through said column jacket parallel to said longitudinal axis, with a lip extending outwardly from said column bracket and encircling said first telescope slot;
   an output shaft disposed within said interior and concentric with said column jacket with said column jacket moveable along said longitudinal axis relative to said output shaft and said rake bracket;
   a first telescoping guide having a first planar portion, a first tubular portion, and a first flange portion, said first tubular portion and said first flange portion extending from said first planar portion, said first flange abutting an exterior surface of said column jacket proximate said lip of said column jacket, said first tubular portion extending through said first telescope slot of said column jacket into said interior of said column jacket; and
   a first fastener coupled to said rake bracket and extending through said first planar portion and said first tubular portion of the first telescoping guide, to define a tilt axis for pivotal movement of said column jacket relative to said rake bracket with said first telescope slot moveable about said first fastener during said movement of said column jacket along said longitudinal axis; further comprising a bearing disposed within said interior of said column jacket and rotatably supporting said output shaft with said column jacket being moveable over said bearing and said bearing translationally fixed along said longitudinal axis relative to said rake bracket, wherein said bearing defines an annular recess with said first tubular portion of said first telescoping guide extending into said annular recess.

\* \* \* \* \*